N. WALLASTER.
Grain Drying Kiln.
No. 59,102.
2 Sheets—Sheet 1.
Patented Oct. 23, 1866.
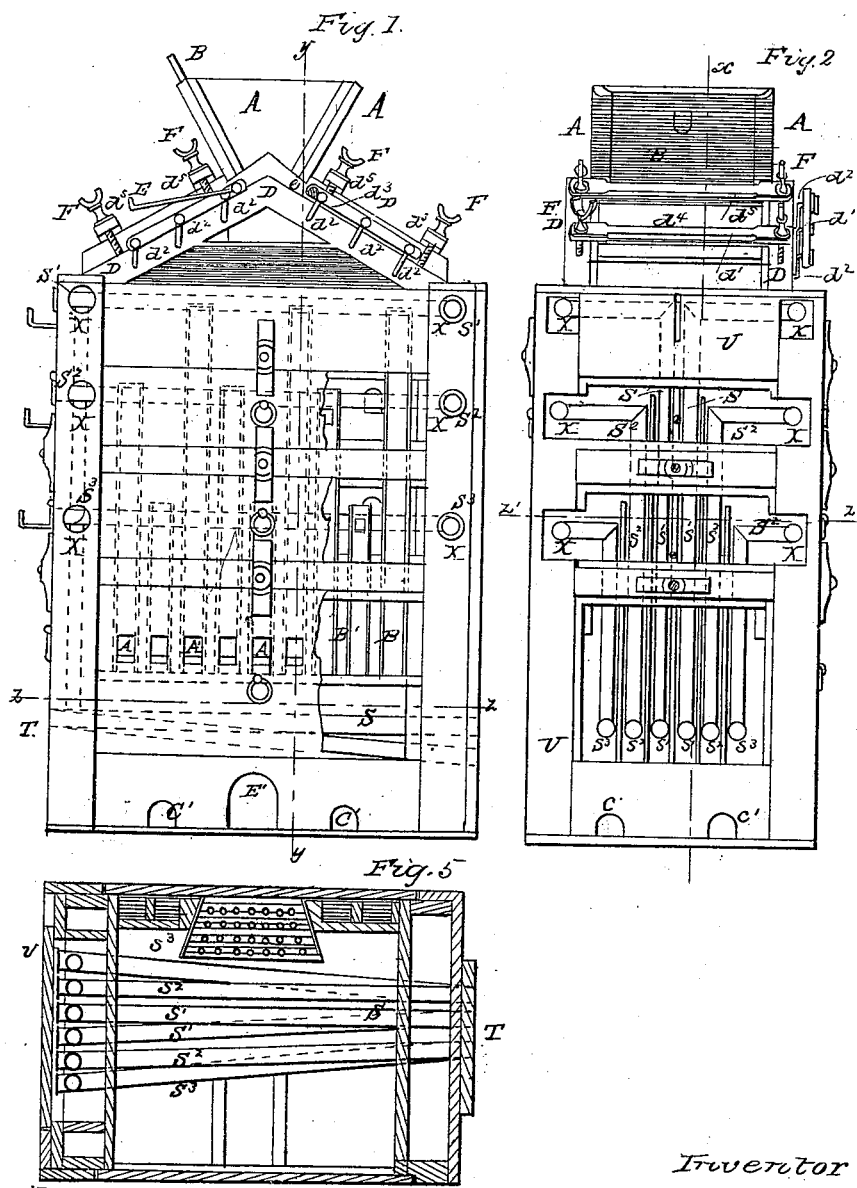

N. WALLASTER.
Grain Drying Kiln.
No. 59,102.
2 Sheets—Sheet 2.
Patented Oct. 23, 1866.
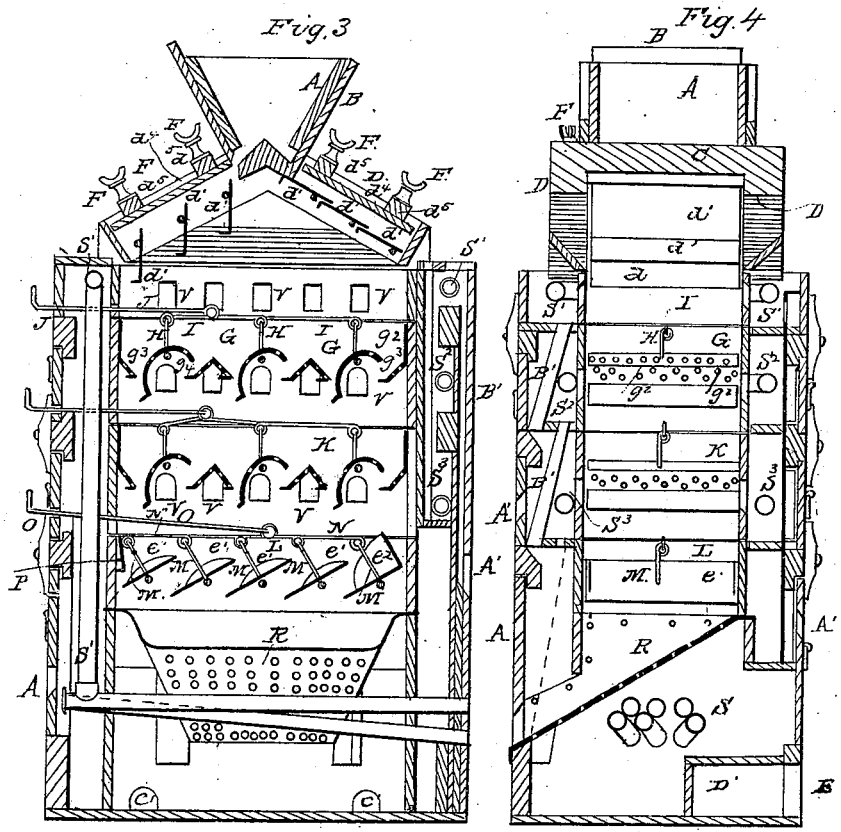
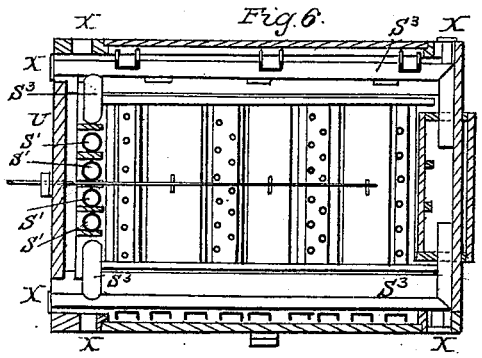
WITNESSES
INVENTOR

UNITED STATES PATENT OFFICE.

NICHOLAS WALLASTER, OF DETROIT, MICHIGAN.

GRAIN-DRYING KILN.

Specification forming part of Letters Patent No. 59,102, dated October 23, 1866.

*To all whom it may concern:*

Be it known that I, NICHOLAS WALLASTER, of Detroit, in the county of Wayne and State of Michigan, have invented a new and useful Improvement in Grain-Kilns; and I do hereby declare that the following is a full, clear, and exact description thereof, which will enable others skilled in the art to make and use the same, reference being had to the accompanying drawings, forming a part of this specification, in which—

Figure 1 is a front view of my improved grain-kiln, a part of the outer wall being broken away to show the arrangement of the cold-air pipes. Fig. 2 is a side view of the same, the shutters or parts of the outer wall being removed to show the arrangement of the hot-air pipes. Fig. 3 is a vertical section of the same, taken through the line $x\ x$, Fig. 2. Fig. 4 is a vertical section of the same, taken through the line $y\ y$, Fig. 1. Fig. 5 is a horizontal section of the same, taken through the line $z\ z$, Fig. 1. Fig. 6 is a horizontal section of the same, taken through the line $z'\ z'$, Fig. 2.

Similar letters of reference indicate like parts.

My invention has for its object to furnish a kiln drying grain conveniently, thoroughly, and in any desired quantity; and it consists of a grain-kiln constructed and arranged as hereinafter more fully described.

A is the hopper, into which the grain is received from the elevator in the ordinary manner. B are slides on the sides of the hopper, by means of which the entrance of the grain into the kiln is regulated. The bottom C of the hopper is made angular, as represented in Fig. 3, so that the grain may pass out of the hopper on both sides, and fill both sides of the loader at the same time. The sides of the loader D are made inclined, as shown in Figs. 1 and 3, so that the grain may readily pass down and fill it. The bottom of the loader D is formed of a series of sections or traps, $d^1$, pivoted to the frame of the loader, as seen in Fig. 3. At one side of the loader the pivoting-rods extend through the frame, and are bent up so as to form levers $d^2$ for operating the sections $d^1$ of the bottom. To the ends of these levers $d^2$ are attached bars $d^3$, by means of which the sections $d^1$ may be operated simultaneously, and the grain allowed to descend to the upper floor of the kiln, covering all parts of the floor equally.

When the bars $d^3$ are moved outward the sections or traps $d^1$ are closed, and they are held in that position by the hook E, which is pivoted to the inner end of one bar, and hooks into an eye, $e$, attached to the inner end of the other bar, as shown in Fig. 1.

The amount of grain intended to be spread over each floor is regulated by the loader D. For this purpose the tops or covers $d^4$ of the loader are made adjustable by being attached to bars $d^5$, through the ends of which pass screws F, by means of which the tops $d^4$ of the loader may be raised or lowered, increasing or diminishing the space between the said covers $d^4$ and the bottom $d^1$ to the required capacity. From the loader D the grain falls to the first floor, G. This floor is formed in sections $g^1$ and $g^2$. The sections $g^1$ are immovably attached to the sides or inner walls of the kiln, as seen in Fig. 3. They are made to incline downward on each side from the central line, and their lower edges are bent, the one inward and the other outward, as shown, so as to form a joint with the edges of the pivoted sections $g^2$. The side sections, $g^3$, are attached to the inner walls of the kiln, and are similar in form to halves of the sections $g^1$.

The sections $g^2$ are made curved, as shown in Fig. 3, and they are securely attached to rods $g^4$, by which they are pivoted to the sides of the kiln. To these sections $g^2$ are also attached arms H, projecting upward, and the ends of these arms are connected by a rod, I, to which the said arms are pivoted.

J is a rod passing in through the side of the kiln, and connected to the rod I, so that by means of the said rod J the sections $g^2$ may be operated simultaneously, discharging the grain upon all parts of the floor K.

The sections $g^1$, $g^2$, and $g^3$ are perforated, as represented in Figs. 3 and 4, to allow the heated air to pass up through them and through the grain spread upon them, removing the moisture therefrom.

The floor K is constructed and arranged in the same manner as described with reference to the floor G. In the floor L the secheated air from the pipes S to pass through it into the kiln. The pipes S are connected directly with the boiler-flues, enter the kiln at the point T, and pass directly across the kiln through the space beneath the spout R, as shown in Figs. 3 and 4, heating the air in said space, which heated air passes up through the openings in the spout R, and thence up through the grain. On reaching the sides U of the kiln the pipes S pass directly upward. The pipes $s^1$ pass up to the upper floor, G, where they separate, pass around the kiln, and into the chimney, as shown in Fig. 6. The pipes $s^2$ pass up to the floor K, where they separate, pass around the kiln, and into the chimney, as before described. The pipes $s^3$ pass up to the floor L, where they separate, pass around the kiln and into the chimney in the same manner as the others. Each of these pipes passes through its own canal, from which there are openings V leading into the interior. These openings are made in the horizontal part of the canals where the pipes are passing around the kiln, and allow heated air to pass into the kiln. The canals are also provided with external openings X at the corners of the kiln, through which access may be obtained to the pipes for the purpose of taking them apart, to remove, clean, repair, or replace them, as may be necessary. These latter openings on these occasions and for this purpose. E' is the opening leading into the furnace D'.

I claim as new and desire to secure by Letters Patent—

1. The loader D, formed by combining the sections or traps $d^1$, the covers $d^4$, the bars $d^5$, and the screws F with each other and with the frame of the loader, substantially as described, and for the purpose set forth.

2. The combination and arrangement of the sections $g^1$ $g^2$ $g^3$ of the floors, constructed as described, in combination with each other, with the sides of the drying-chamber, and with the arms H and rods I and J, substantially as described, and for the purpose set forth.

3. The combination of the pipes S $s^1$ $s^2$ $s^3$, constructed and arranged as described, with the canals formed in the sides of the kiln between its outer and inner walls, substantially as described, and for the purposes set forth.

4. The combination of the pipes B' with the openings A' in the outer wall of the kiln, and with the canals through which pass the pipes $s^1$ $s^2$ $s^3$, substantially as described and for the purpose set forth.

N. WALLASTER.

Witnesses:
 CARL SCHMEMANN,
 LOUIS GRIESINGER.